Aug. 22, 1967

M. A. LACE 3,337,700

ADJUSTABLE TIMING DEVICE

Filed April 22, 1965

Inventor
Melvin A. Lace
By Hofgren, Wegner, Allen, Stellman & McCord
Attorneys

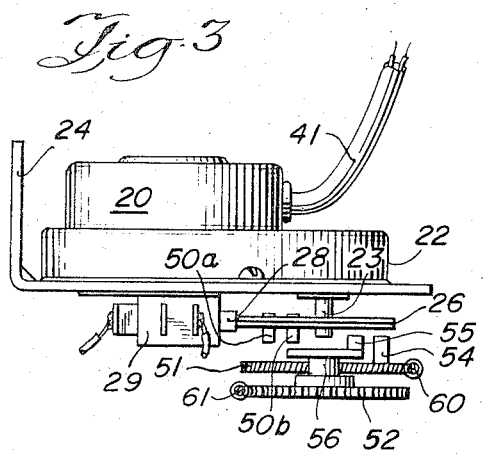
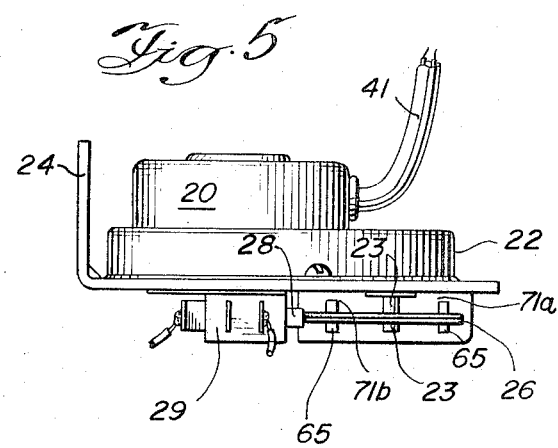
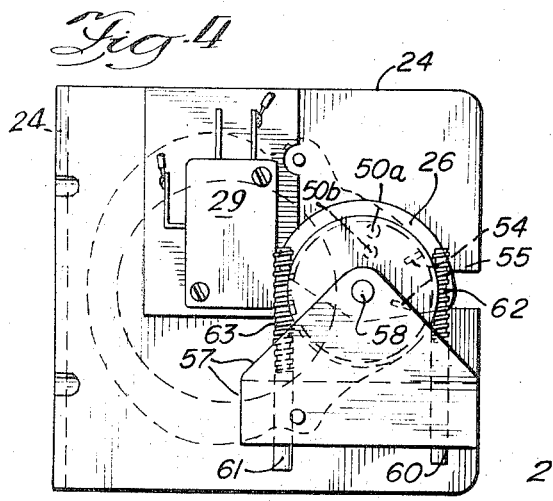
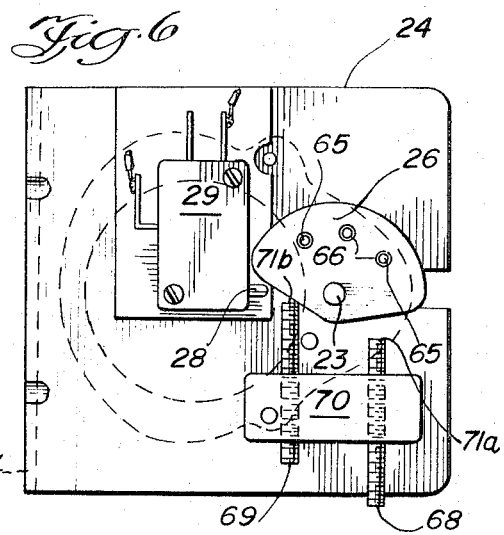
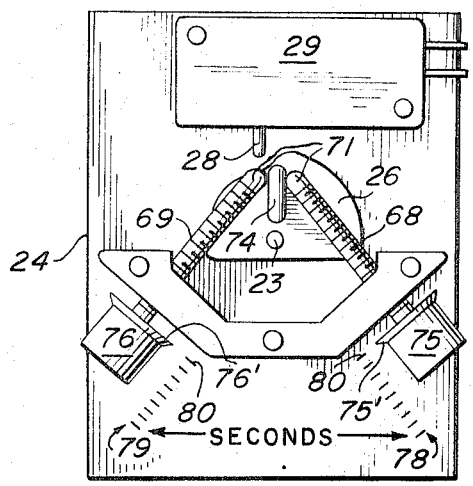

Aug. 22, 1967 M. A. LACE 3,337,700
ADJUSTABLE TIMING DEVICE
Filed April 22, 1965 6 Sheets-Sheet 4
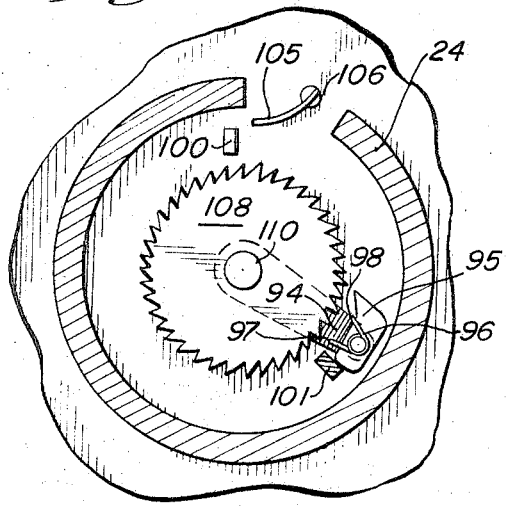
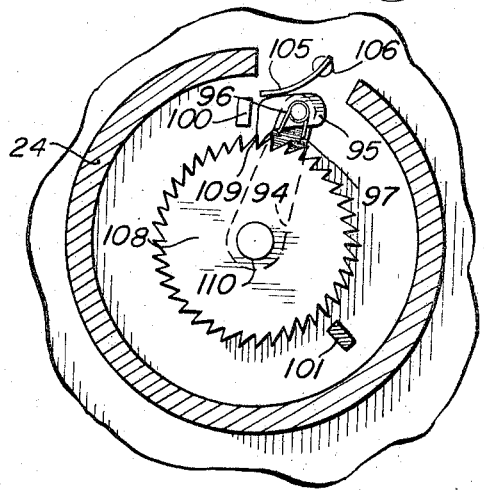
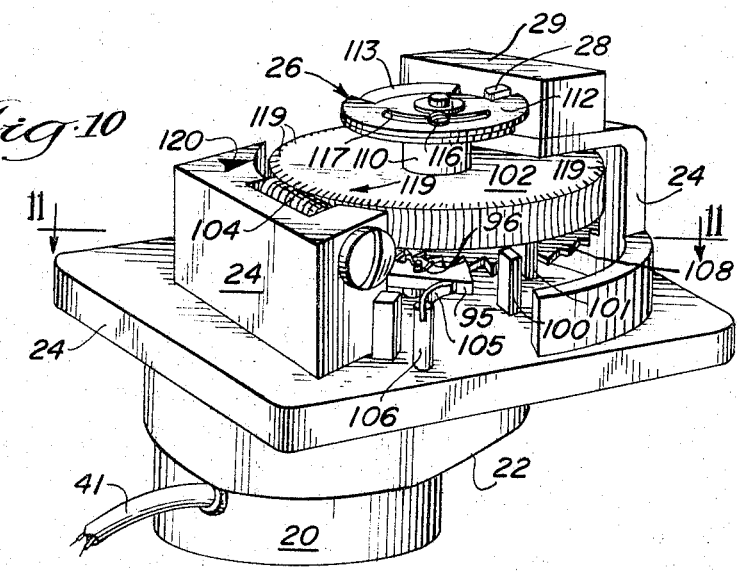
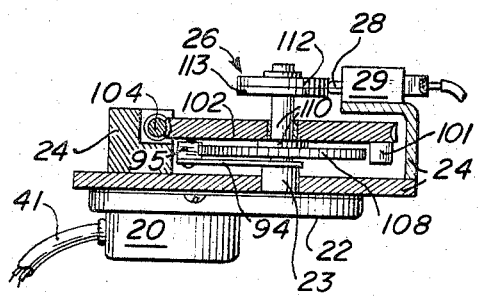

Aug. 22, 1967  M. A. LACE  3,337,700
ADJUSTABLE TIMING DEVICE
Filed April 22, 1965

M. A. LACE 3,337,700

ADJUSTABLE TIMING DEVICE

Filed April 22, 1965

United States Patent Office 3,337,700
Patented Aug. 22, 1967

3,337,700
ADJUSTABLE TIMING DEVICE
Melvin A. Lace, Prospect Heights, Ill., assignor to Oak Electro/Netics Corp., a corporation of Delaware
Filed Apr. 22, 1965, Ser. No. 450,074
7 Claims. (Cl. 200—38)

This invention relates to a timing device, and more particularly to an adjustable timer for periodically actuating a mechanical apparatus, as a switch.

In the present invention, a bi-directional self-starting motor rotates a cam member that engages an actuating means associated with a switch. This engagement causes the actuating means to move a predetermined amount, thereby operating the switch. In one embodiment of this invention, this operation causes a pair of electrical contacts to close or open, for controlling the condition of an electrical circuit connected thereto. While the invention will be described in conjunction with the actuation of an electrical switch and it is particularly suited for such use, certain features are not limited thereby, but may be utilized to operate other mechanisms.

The bi-directional motor when constrained from rotation in the one direction, will rotate in the opposite direction. This constraint may be provided by stops which are engaged by a member rotated by the motor, thereby causing the motor to stop and reverse direction.

Prior devices of this nature have not been capable of producing a wide range of pulse rates or duty cycles. Furthermore, prior devices have employed a motor using a heavy rotor, as a permanent magnet rotor. The large torques produced in such a motor when suddenly stopped or started can cause the rotor to shear from its shaft, the shaft itself to break, or failure of some other element driven by the rotor.

Accordingly, it is a principal object of this invention to provide an improved timing device for actuating a switch.

It is another object of this invention to provide a timing device utilizing a bi-directional self-starting synchronous motor with a light salient pole rotor.

One feature of this invention is that the length and period of time of actuation of a switch may be varied over a continuous wide range.

Another feature of this invention is the provision of a timing device that will produce electrical impulses with a period that is longer, and may be substantially longer, than the period of one cycle of the motor.

A further feature of this invention is that the length and period of time of electrical impulses produced by the actuation of an electrical switch may be continuously varied over a substantial range by the continuous rotation of shaft members which may be indexed to indicate the total actuation and deactuation time of the switch.

Yet another feature of this invention is the provision of a timing device having a single continuously adjustable means for both energizing the timing device and varying the length of time of actuation of a switch associated therewith.

Further features and advantages will become apparent from the following specification and from the drawings, in which:

FIGURE 3 is a side view of another embodiment of the timing device, utilizing continuously adjustable stop members;

FIGURE 4 is a top view of the timing device of FIGURE 3;

FIGURE 5 is a side view of another embodiment of the timing device, utilizing a different embodiment of the continuously adjustable stop members;

FIGURE 6 is a top view of the timing device of FIGURE 5;

FIGURE 7 is a top view of another embodiment of the timing device, utilizing continuously variable stops indexed to indicate the total time of actuation and de-actuation of the switch associated therewith;

FIGURE 10 is a perspective view of another embodiment of the timing device for actuating a switch for a period that is longer, and may be substantially longer, than the period of one cycle of the reciprocating motor;

FIGURE 11 is a partial fragmentary view taken along lines 11—11 of FIGURE 10;

FIGURE 12 is another partial fragmentary view, similar to FIGURE 11, and illustrating the movable member in another position;

FIGURE 13 is a side view of the timing device of FIGURE 10;

Figure 1:
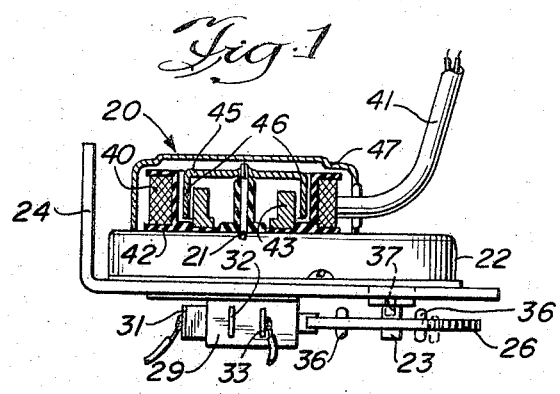
FIGURE 1 is a side view, partly in section, of one embodiment of the timing device utilizing removable pegs.

While illustrative embodiments of the invention are shown in the drawings and will be described in detail herein, the invention is susceptible of embodiment in many different forms and it should be understood that the present disclosure is to be considered an exemplification of the principles of the invention and is not intended to limit the invention to the embodiments illustrated. The scope of the invention will be pointed out in the appended claims.

Figure 2:
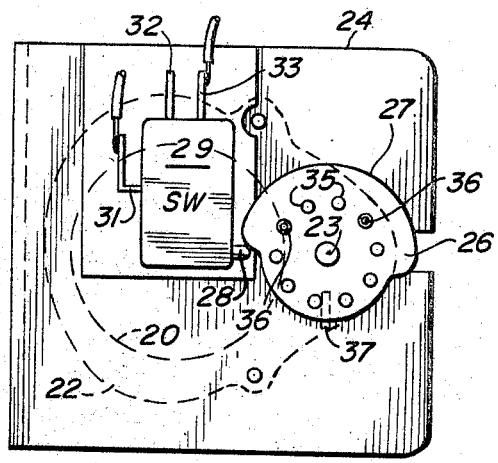
FIGURE 2 is a top view of the timing device of FIGURE 1.

Turning now to FIGURES 1 and 2, one embodiment of the timing device is illustrated. A bi-directional self-starting synchronous motor 20 has a rotating shaft 21 coupled through gears (not illustrated) contained in a housing 22 to a shaft 23 rotatably mounted on a base 24. Affixed to shaft 23 is a timing cam 26 having an actuating surface 27 for engaging an actuating means, in the form of a plunger 28 of an electrical switch 29. Extending from switch 29 is a contact element 31 which is movable between contacts 32 and 33 by plunger 28 providing both normally open and normally closed switching. Other switching combinations could be used.

Cam 26 has a plurality of apertures 35 in which stops in the form of removable pegs 36 may be inserted. A projecting abutment 37 is affixed to base 24 and extends outwardly therefrom, as illustrated by the dotted lines in FIGURE 1, into the path of the pegs 36 carried on the rotating cam 26. The motor 20 will cause cam 26 to rotate in one direction until one peg 36 inserted through one of the apertures 35 is rotated into engagement with fixed abutment 37. The engagement of peg 36 and abutment 37 will cause motor 20 to stop rotation in the one direction and begin rotation in the opposite direction. This rotation in the opposite direction will continue until the other peg 36 is rotated into engagement with abutment 37, causing another reversal of motor 20.

The rotation of shaft 23 in one direction, and then in the opposite direction back to its point of origin defines the period of time of one cycle of the timer. During this period of time, surface 27 has engaged plunger 28 for a certain interval of time, i.e., the duty cycle. As can be seen from FIGURES 1 and 2, both the total period of time, and the interval of time that switch 29 is actuated, may be varied by inserting pegs 36 in different apertures 35 which encircle shaft 23 near the periphery of cam 26. With pegs 36 located as illustrated in FIGURE 2, it will be observed that plunger 28 is actuated for a length of time equal to one-half the period of the reciprocating motor. By removing one of the pegs 36 and inserting it in another aperture 35, the interval of time that switch 29 is actuated will be varied, as will the total period of time.

The bi-directional self-starting motor 20 which makes the extremely accurate timing device described above possible is illustrated in cross-section in FIGURE 1. This motor is fully disclosed in a co-pending application of Melvin A. Lace, "Motor," Ser. No. 411,986, now Patent No. 3,310,607 filed Nov. 18, 1964, and assigned to the assignee of this invention. Briefly, motor 20 has an encircling winding 40 for producing an alternating magnetic flux field. Winding 40 is connected through a pair of electrical conductors 41 to an AC potential source (not illustrated).

Winding 40 is held within a bobbin 42 which also serves to position a cylindrical permanently magnetized stator 43. A light weight magnetizable rotor 45 has salient poles 46 thereon which are spaced between the stator 43 and the encircling winding 40. With a partial flux path provided by a cover 47, the alternating flux field of winding 40 magnetizes the salient poles 46 of rotor 45, causing the shaft 21 connected to rotor 45 to rotate. Rotor 45 will begin to rotate in either a clockwise or counterclockwise direction when the motor is energized, depending upon the instantaneous polarity of of the magnetic flux field at the time of starting.

With the low inertia rotor construction illustrated, motor 20 will reach synchronous speed almost immediately. Furthermore, due to the low torque and low inertia rotor, the sudden stop caused by the impact of peg 36 with abutment 37 is not destructive to the motor. The stopped rotor 45, being constrained from further rotation, will on reversal of the field rotate at synchronous speed in the opposite direction. With the motor construction illustrated, cam 26 is continuously turned at synchronous speed, producing a highly accurate timing device.

Any switch, whether mechanical or electrical, which can be actuated by the engagement of its actuating means with a portion of cam 26 can be substituted for electrical switch 29. For example, in place of switch 29 illustrated, a light source (not illustrated) could project a photobeam, through the area occupied by plunger 28, to a photocell. The engagement of actuating surface 27 with the actuating means, i.e., the light beam, would interrupt the flow of current to the photocell, thus actuating the electrical circuit connected thereto. Similarly, the movement of plunger 28 could be utilized in a purely mechanical device for moving a member in accordance with the motion of cam 26. Therefore, for the purpose of this disclosure, a switch having an actuating means is defined to include any device which can utilize the movement of a timing cam 26 to produce a desired result.

While the timing device illustrated in FIGURES 1 and 2 operates satisfactorily in certain limited applications, the timing devices illustrated in the remaining FIGURES 3 through 17 provide more versatile operations necessary for many timing applications.

In the embodiment of FIGURES 3 and 4, the motor 20 rotates timing cam 26 into engagement with plunger 28, in the manner previously described. Cam 26 has a pair of radially spaced abutments 50a and 50b thereon.

First and second gears 51 and 52 are rotatably mounted concentric with cam 26. Gear 51 has a projecting stop 54 affixed thereto. A second projecting stop 55 is attached to a bushing 56, one end of which is affixed to gear 52. The gears 51 and 52 are rotatably held in position by a bracket 57 having a rivet 58 extending therefrom which passes through a central cylindrical opening in gear 52 and bushing 56.

Bracket 57 also rotatably mounts shafts 60 and 61 having worm gears 62 and 63 thereon which engage the gears 51 and 52, respectively. Rotation of shaft 60 causes the projecting stop 54 to move in the path of one of the abutments 50. Similarly, the rotation of shaft 61 will cause the projecting stop 55 to be rotated to different points in the path of the other of the abutments 50. Therefore, both the total period of time and the length of time that switch 29 is actuated may be continuously varied by movement of the shafts 60 and 61.

In FIGURES 5 and 6, another timer is illustrated which allows the period of one cycle and the length of time of actuation to be continuously varied. Although this timer does not allow as great a range of adjustment as that of FIGURES 3 and 4, the simpler construction has advantages for many applications. In place of the fixed abutments 50, movable abutment pins 65, inserted in apertures 66 on cam 26, are provided. A first and second threaded shaft 68 and 69 are movably mounted within a base 70 having threaded apertures therein for receiving the shafts. The ends of shafts 68 and 69 have surfaces 71a and 71b thereon which serve as the stops for abutments 65. As the shafts 68 and 69 are rotated, the stops 71 will be moved to different points along the path of the rotating abutments 65, thereby changing the period of one cycle and the length of time of actuation of switch 29. The abutments 65 may be inserted in different apertures 66 to provide a wider range of adjustments than is possible by movement of shafts 68 and 69 alone.

In FIGURE 7, another embodiment of the timing device, similar to FIGURE 6, is illustrated. An abutment 74 is affixed to the cam 26. The ends of the shafts 68 and 69 have knobs 75 and 76, respectively, connected thereto. When the shafts are screwed fully inward to the positions illustrated, index members 75' and 76' on knobs 75 and 76, respectively, correspond to a "zero" position or mark 80 on base 24. A first set of indicia 78 extends from the mark 80 associated with knob 75, and a second set of indicia 79 extends from the mark 80 associated with knob 76. These indicia may, for example, comprise recessed grooves formed in base 24. The indicia 78 indicate the total time switch 29 is not actuated, as is apparent from FIGURE 7. Similarly, indicia 79 indicate the total time that switch 29 is actuated through the engagement of plunger 28 with cam 26. By varying the positions of knobs 75 and 76, both the time switch 29 is actuated and the period of one cycle of operation may be established, as indicated by indicia 78 and 79.

Figure 8:
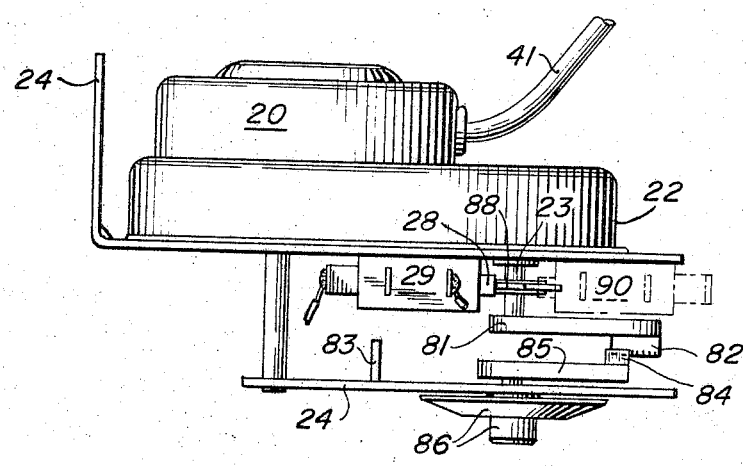
FIGURE 8 is a side view of another embodiment of the timing device, having a switch which is actuated for approximately one-half of the period of one cycle of the reciprocating motor.
Figure 9:
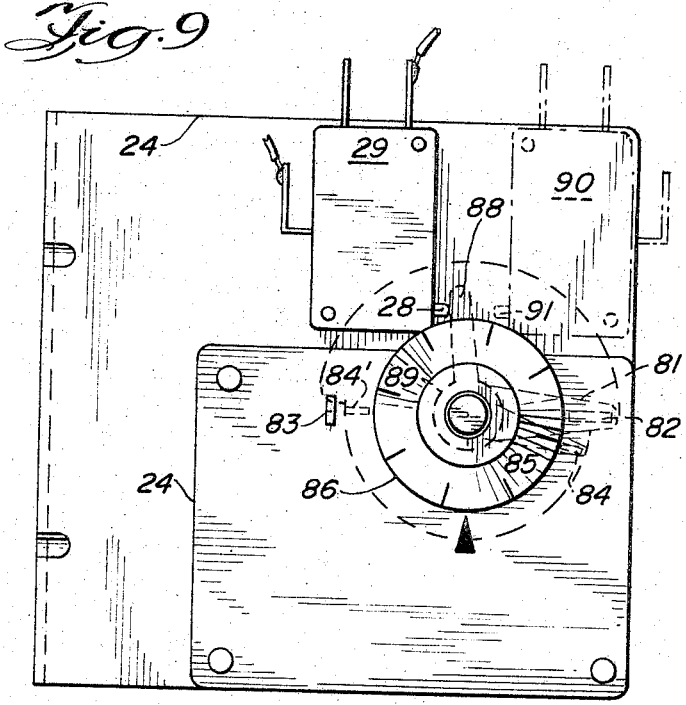
FIGURE 9 is a top view of the timing device illustrated in FIGURE 8.

In FIGURES 8 and 9, another embodiment of the timing device is illustrated which will actuate the switch 29 for approximately one-half of the period of one cycle of the reciprocating motor 20. A timing member 81 having an abutment 82 thereon is attached to the rotating shaft 23. The abutment 82 rotates between a fixed stop 83 and a movable stop 84 mounted on the end of an arm 85. The other end of arm 85 is secured to a rotatable knob 86 which may be suitably indexed with indicia. As knob 86 is rotated, stop 84 is rotated to different points in the path of the rotating abutment 82 for engagement therewith, causing motor 20 to reverse its direction of rotation. The total period of one cycle is, therefore, adjusted by rotation of the knob 86. If the maximum total period is desired, knob 86 is rotated until stop 84 is located at the position 84' illustrated in FIGURE 9.

A second arm 88 for actuating plunger 28 is connected to shaft 23 through a clutch 89 which allows arm 88 to slip on shaft 23 after the plunger 28 has been fully depressed. Clutch 89 may be any conventional unit, well known in the art, which slips on a shaft after being constrained from rotation. The arm 88 is thereby held against the plunger 28 each time the motor 20 rotates the shaft 23 in a counterclockwise direction, i.e., for one-half of each cycle of the reciprocating motor.

A second switch 90 may be located adjacent switch 29, in the position shown by the dotted lines in FIGURES 8 and 9. A plunger 91 on switch 90 will be depressed the maining one-half of the cycle during the time plunger 28 is released. By utilizing switches 29 and 90, a timing device is formed which alternately actuates two switches, each for approximately one-half the period of time of the reciprocating motor.

If only a single switch 29 is to be provided, switch 90 would be removed, and an abutment (not illustrated) provided at the location now occupied by plunger 91 for stopping the arm 88.

In FIGURES 10 through 13, a timing device is illustrated for actuating switch 29 during a recurring period of time that is longer than the time necessary to move the abutment carrying member through an angular distance equal to one complete revolution. This period of time is also longer than the period of one cycle of the reciprocating motor 20. The rotating shaft 23, as seen in FIGURE 13, has attached thereto an arm 94 having a pawl 95 rotatably secured at the end. A biasing spring 96 has one end 97 mounted through an aperture in arm 94, while the other end 98 abuts pawl 95, urging it into a first position as illustrated in FIGURE 12. A fixed stop 100 is provided to be engaged by pawl 95 at the end of its counterclockwise rotation, as viewed in FIGURES 11 and 12.

A movable stop 101 is carried by a gear 102 rotated by a manually adjustable worm screw 104. The rotation of worm screw 104 rotates stop 101 to different points in the path of the rotating pawl 95 for engagement therewith, causing the motor 20 to reverse its direction of rotation, thereby changing the total period of one cycle of the reciprocating motor.

As pawl 95 approaches stop 100, a leaf spring 105 mounted on post 106 will force pawl 95 out of its first position and into engagement with a ratchet wheel 108, as seen in FIGURE 11. Upon engagement, pawl 95 will rotate wheel 108 by a fixed increment. At the same time, pawl 95 will abut stop 100, thereby reversing the rotation of the motor 20.

As is best seen in FIGURE 13, the timing cam 26 which engages the plunger 28 of switch 29 is connected through a shaft 110 to ratchet wheel 108 for rotation thereby. As a result, cam 26 and shaft 110 are rotated by an incremental amount for every cycle of the reciprocating motor. Therefore, switch 29 is periodically actuated in the manner described below for a length of time within a recurring period of time that is substantially longer than the period of one cycle of the reciprocating motor.

The cam 26 is a two-piece split cam, as seen in FIGURES 10 and 13. Two discs 112 and 113 are adjustable to change the length of time during which the plunger 28 is depressed by the actuating surfaces of cam 26. A set screw 116 located in a slot 117 in disc 112 allows the disc 112 to be rotated relative to disc 113.

The total period of one complete cycle of cam 26, which corresponds to the period of one cycle of the electrical impulse formed by the switch 29, may be indicated by means of indicia 119, located around the periphery of gear 112, and an indexing mark 120 provided on the base 24. The position of gear 102 illustrated in FIGURE 10 represents the maximum period possible. For example, with a 64-tooth ratchet 108 and a 12 r.p.m. motor, a continuously adjustable period of time from 10 seconds to approximately 600 seconds is provided.

Figure 14:
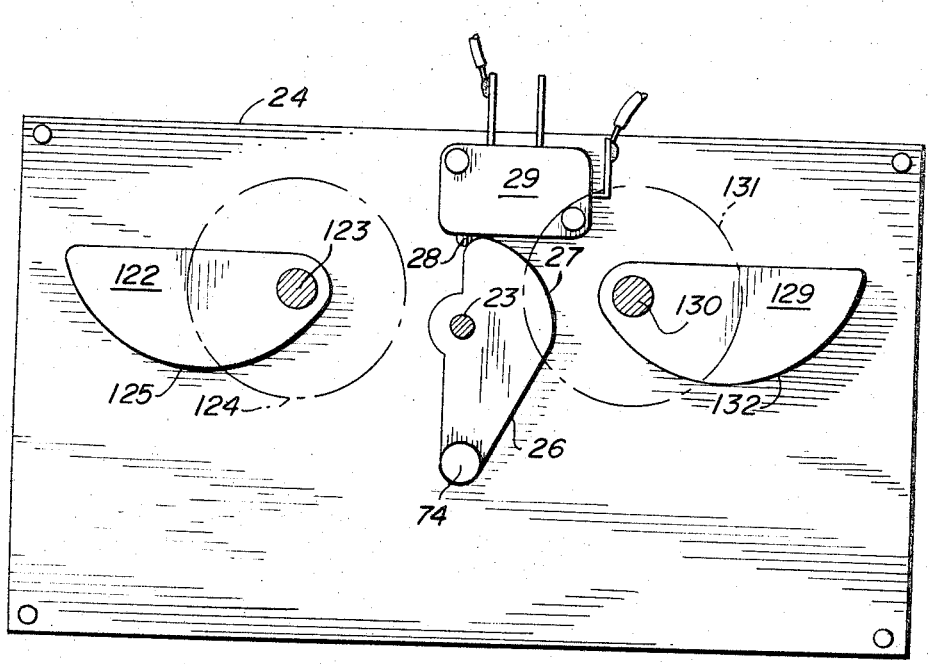
FIGURE 14 is a top view of another embodiment of the timing device, utilizing continuously variable stops.
Figure 15:
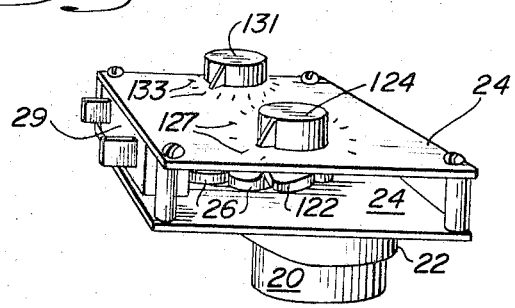
FIGURE 15 is a perspective view of the timing device of FIGURE 14.

In FIGURES 14 and 15, another embodiment of the timing device, which allows the total actuation and deactuation time to be individually adjusted, is illustrated. The motor 20, through gears contained in housing 22, rotates shaft 23. The cam 26, having abutment 74 thereon, is attached to shaft 23 as previously described. A first stop member 122 is affixed to a shaft 123 which is rotated by a knob 124 located on an exposed surface of base 24. Stop 12 has an arcuate surface 125 spaced from the center axis of shaft 123 by a continually increasing distance. In the embodiment illustrated, stop 122 has a semicircular surface 125 and an eccentric shaft 123. As shaft 123 is rotated, surface 125 will be rotated to different points in the path of abutment 74, thereby changing the point of engagement and hence the point at which the motor reverses its direction of rotation. Stop 122 controls the length of the de-activation time for switch 29. This time may be indicated by indicia 127 on the surface of base 24 and associated with knob 124.

In a similar manner, a second stop member 129 is eccentrically affixed to a shaft 130 which is rotatable by a knob 131. Stop 129 has an arcuate surface 132 identical to the surface 125. Indicia 133 associated with knob 131 are provided on base 24 to indicate the total length of activation time of switch 29.

Figure 16:
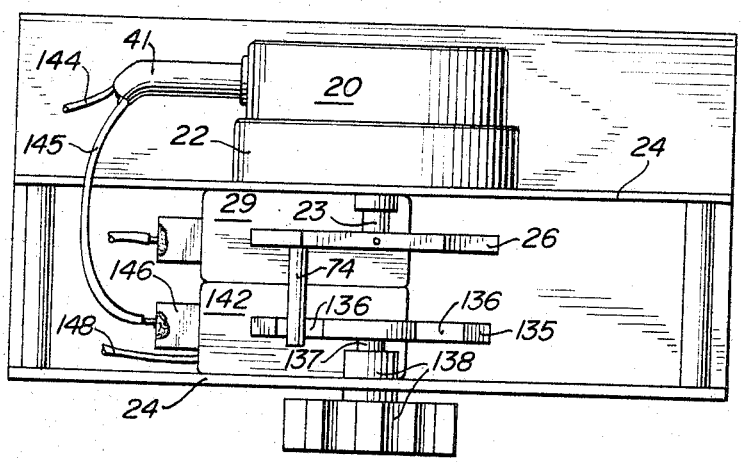
FIGURE 16 is a top view of another embodiment of a timing device, utilizing a single control for energizing the motor and varying the length of time a switch associated therewith is actuated.
Figure 17:
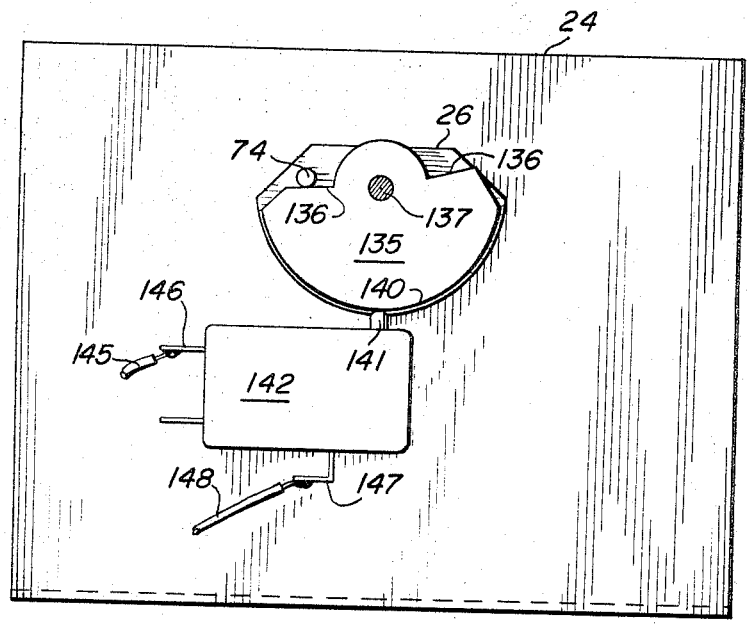
FIGURE 17 is a side view of the timing device of FIGURE 16.

In FIGURES 16 and 17, a novel timing device is illustrated in which a single continuously adjustable control varies the duty cycle of a switch without varying its period of operation. A timing cam 26 having an abutment 74 thereon is provided for engaging switch 29. In addition, a second cam 135 having stop surfaces 136 thereon is rotatably mounted concentric with cam 26 by means of a shaft 137 affixed to a knob 138. The stop surfaces are each located a fixed radial distance from shaft 137.

As shaft 137 is rotated relative to base 24 and switch 29, the stops 136 will be rotated to new positions in the path of the abutment 74. Since the angular distance between the stops remains the same, cam 26 will always reciprocate through a fixed angular distance. As a result, the period of operation remains constant. However, the location of this fixed arcuate path is rotated relative to fixed switch 29, hence the time during which switch 29 is actuated, i.e., the duty cycle, is varied, in this case between zero degrees to 100 degrees.

Cam 135 has an actuating surface 140 which engages a plunger 141 on an electrical switch 142 which is provided for energizing motor 20. For example, motor 20 may be energized when conductors 144 and 145 are connected to an AC source (not illustrated). For this purpose, conductor 144 may be coupled directly to the AC source. Conductor 145 is connected to a contact element 146 of switch 142. When plunger 141 is depressed, the switch 142 electrically connects element 146 to a second contact element 147 having a conductor 148 connected thereto and coupled to the other side of the AC source. When cam 135 is rotated 90° counterclockwise from the position viewed in FIGURE 17, plunger 141 will no longer engage actuating surface 140, and the timer will be deenergized. When the timer is to be used, knob 138 is rotated to a position which provides the desired duty cycle. Motor 20 will thereby be actuated, causing abutment 74 to rotate between the stop surfaces 136, in a manner previously described. Therefore, the rotation of a single continuously adjustable control, viz., knob 138, energizes the motor and varies the portion of the cyle during which switch 29 is actuated.

I claim:
1. A timing device, comprising: a bi-directional self-starting motor having means for producing an alternating magnetic flux field, a permanently magnetized stator, and a salient pole rotor magnetizable by said alternating flux field, said rotor having a low inertia construction which, when constrained from rotation in one direction, will rotate in the opposite direction; a base member upon which said motor is affixed; a second member having a cam surface thereon; means connecting said second member to said rotor for rotation thereby; actuating means positioned to be actuated by said cam surface; abutment means located on one of said members; and two stop means located on the other of said members for engaging said abutment means to cause said rotor to stop rotation in the one direction and begin rotation in the opposite direction, the position of at least one of said stops being variable, whereby the period and duty cycle of said actuating means are dependent upon the location of both said stops.

2. A timing device for periodically actuating a switch, comprising: a bi-directional self-starting motor which, when constrained from rotation in one direction, will rotate in the opposite direction; a base upon which said motor is fixed; a timing cam having an actuating surface and abutment means; means connecting said timing cam to said motor for rotation thereby; a switch affixed to said base and having actuating means positioned to be actuated by said cam surface; a first stop member for engaging said abutment means; mounting means on said base; a first threaded shaft rotatably held within said mounting means for movement of said shaft relative to a first fixed position on said base, said shaft being operatively connected with said first stop member to position the same at different points in the path of said abutment means, the engagement of said stop member with said abutment means causing said motor to stop rotation in the one direction and begin rotation in the opposite direction; a second stop member for engaging said abutment means; a second threaded shaft rotatably held within said mounting means for movement thereof relative to a second fixed position on said base, said second shaft being operatively connected with said second stop member to position the same at different points in the path of said abutment means, the engagement of said second stop member with said abutment means causing said motor to stop rotation in the opposite direction and begin rotation in said one direction; and a first and second set of indicia associated with said first and second positions respectively, wherein the total time said switch is actuated is adjusted by moving said first threaded shaft relative to said first set of indicia and the total time said switch is deactuated is adjusted by moving said second threaded shaft relative to said second set of indicia.

3. A timing device for periodically actuating a switch, comprising: a bi-directional self-starting motor which, when constrained from rotation in one direction, will rotate in the opposite direction; a base upon which said motor is affixed; a timing cam having an actuating surface and abutment means; means connecting said timing cam to said motor for rotation thereby; a switch affixed to said base and having actuating means positioned to be actuated by said cam surface; a first stop member for engaging said abutment means; mounting means on said base; a first elongated shaft movably held within said mounting means for longitudinal movement parallel with the direction of elongation of the shaft, said shaft being operatively connected with said first stop member to position the same at different points in the path of said abutment means by longitudinal movement of the shaft, the engagement of said stop member with said abutment means causing said motor to stop rotation in one direction and begin rotation in the opposite direction; and second stop member means for causing said motor to stop rotation in the opposite direction and begin rotation in said one direction.

4. The timing device of claim 3 wherein an end portion of said elongated shaft forms said first stop member.

5. The timing device of claim 3 wherein said shaft is threaded along a portion movable within said mounting means, whereby rotation of said shaft moves said shaft in the longitudinal direction.

6. A timing device for periodically actuating a switch, comprising: a bi-directional self-starting motor which, when constrained from rotation in one direction, will rotate in the opposite direction; a base upon which said motor is affixed; a cam having an actuating surface and a first and a second abutment means thereon, at least one of said abutment means being movable to different positions on said cam; means connecting said timing cam to said motor for rotation thereby; a switch affixed to said base and having actuating means positioned to be actuated by said cam surface; a first and a second stop surface means affixed to said base, said surface means engaging said abutment means to cause said cam to reciprocate therebetween, at least one of said stop surface means being movable to different positions in the path of the abutment means, whereby the time of actuation of said switch is controlled by the movement of said one abutment means on said cam and by the movement of said one stop surface means on said base.

7. The timing device of claim 6 wherein a single one of said one abutment means and one stop surface means is continuously adjustable along a first path and the other of said one means is adjustable to only certain spaced positions along a second path.

References Cited
UNITED STATES PATENTS

| | | |
|---|---|---|
| 2,574,841 | 11/1951 | Powell. |
| 2,614,187 | 10/1952 | Dorothea. |
| 3,185,874 | 5/1965 | Hunt. |
| 3,293,385 | 12/1966 | Travaglio. |
| 3,304,451 | 2/1967 | Scholten _____ 310—154 |
| 3,310,697 | 3/1967 | Lace _____ 310—154 |

BERNARD A. GILHEANY, *Primary Examiner.*

G. MAIER, H. E. SPRINGBORN,
*Assistant Examiners.*